`US012523471B2`

United States Patent
Joet et al.

(10) Patent No.: US 12,523,471 B2
(45) Date of Patent: Jan. 13, 2026

(54) MEMS-TYPE INERTIAL SENSOR WITH SPECIFIC MECHANICAL LINK

(71) Applicant: COMMISSARIAT À L'ENERGIE ATOMIQUE ET AUX ENERGIES ALTERNATIVES, Paris (FR)

(72) Inventors: Loïc Joet, Grenoble (FR); Patrice Rey, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 335 days.

(21) Appl. No.: 18/478,405

(22) Filed: Sep. 29, 2023

(65) Prior Publication Data

US 2024/0110788 A1 Apr. 4, 2024

(30) Foreign Application Priority Data

Sep. 30, 2022 (FR) ........................................ 2209981

(51) Int. Cl.
*G01C 19/5712* (2012.01)
(52) U.S. Cl.
CPC .................................. *G01C 19/5712* (2013.01)
(58) Field of Classification Search
CPC ............ G01C 19/5712; G01C 19/5733; G01C 19/574; G01C 19/5747
See application file for complete search history.

(56) References Cited

U.S. PATENT DOCUMENTS

| 5,920,012 A * | 7/1999 | Pinson | G01R 33/0286 |
| | | | 73/504.04 |
| 8,978,475 B2 * | 3/2015 | Acar | G01C 19/5733 |
| | | | 73/514.32 |
| 10,415,968 B2 * | 9/2019 | Prikhodko | G01C 19/5769 |
| 10,466,053 B2 * | 11/2019 | Ruohio | G01C 19/5747 |
| 10,948,294 B2 * | 3/2021 | Gregory | G01C 19/5747 |
| 2009/0223277 A1 * | 9/2009 | Rudolf | G01C 19/5642 |
| | | | 73/1.37 |
| 2010/0037690 A1 | 2/2010 | Guenthner et al. | |
| 2010/0281977 A1 | 11/2010 | Coronato et al. | |
| 2013/0263664 A1 | 10/2013 | Kanemoto | |

(Continued)

FOREIGN PATENT DOCUMENTS

EP 2 963 387 A1 1/2016

OTHER PUBLICATIONS

ER Search Report as issued in French Patent Application No. FR2209981, dated May 30, 2023.

*Primary Examiner* — David J Bolduc
(74) *Attorney, Agent, or Firm* — Pillsbury Winthrop Shaw Pittman LLP

(57) ABSTRACT

A micro-electromechanical device of the inertial sensor type, includes a support, a movable frame, translationally guided along an axis of displacement parallel to the support, and including a proof mass which extends from a first end, connected to the support through a mechanical link, up to a second end, the mass being connected, on the side of the second end, to a member for detecting pivoting of the mass with respect to the frame. The link includes a thin, flexible wall which extends parallel to the support, from the frame to the first end of the proof mass, along a mean line which is parallel to the axis of displacement of the frame.

9 Claims, 7 Drawing Sheets

(56) References Cited

U.S. PATENT DOCUMENTS

| | | | |
|---|---|---|---|
| 2014/0182375 A1* | 7/2014 | Kim | G01C 19/5712 |
| | | | 73/504.12 |
| 2014/0331770 A1* | 11/2014 | Jourdan | B81B 3/0051 |
| | | | 73/514.01 |
| 2015/0377624 A1* | 12/2015 | Falorni | B81B 3/0018 |
| | | | 73/504.12 |
| 2017/0108336 A1* | 4/2017 | Boysel | G01C 19/5712 |
| 2018/0031602 A1* | 2/2018 | Huang | G01P 15/13 |
| 2018/0283867 A1* | 10/2018 | Ruohio | G01C 19/5747 |
| 2019/0187169 A1* | 6/2019 | Tang | G01C 19/5656 |
| 2020/0102211 A1* | 4/2020 | Joet | B81B 3/0072 |
| 2020/0200535 A1* | 6/2020 | Kuisma | G01C 19/5712 |
| 2020/0317505 A1* | 10/2020 | Rey | B81B 3/0072 |
| 2021/0293847 A1* | 9/2021 | Liukku | G01P 15/18 |
| 2021/0381832 A1* | 12/2021 | Prikhodko | G01C 19/5712 |

\* cited by examiner

[Fig. 1]
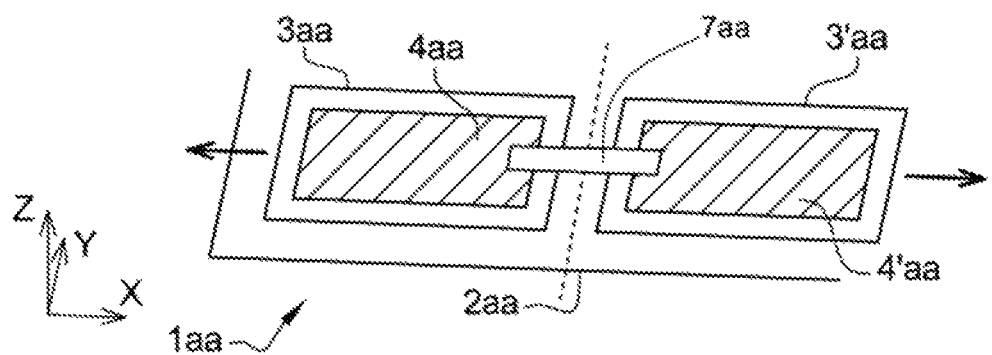
[Fig. 2]
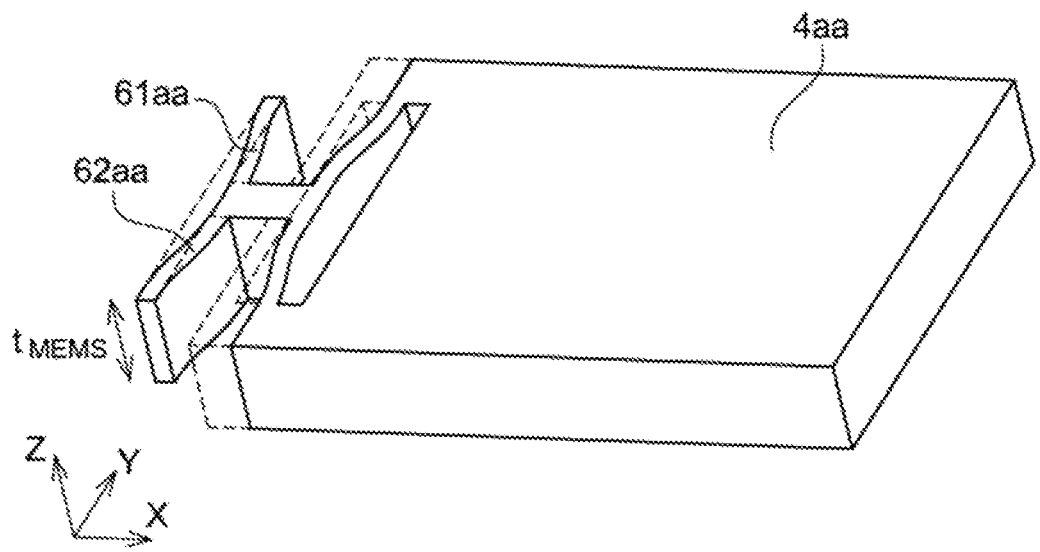

[Fig. 3]
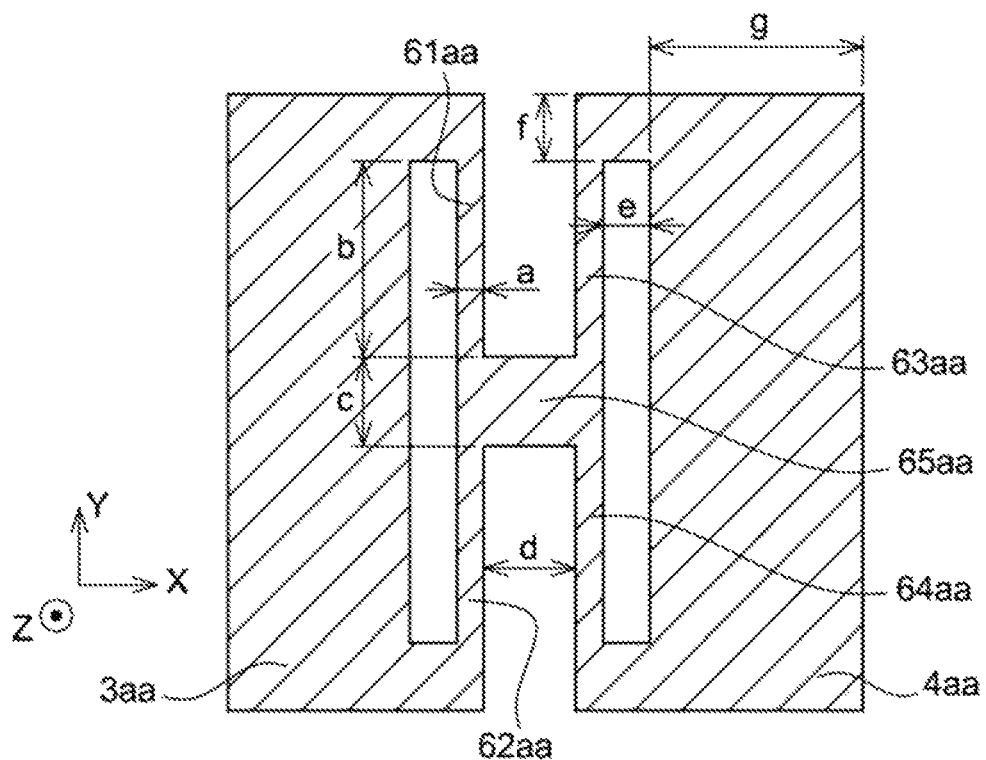

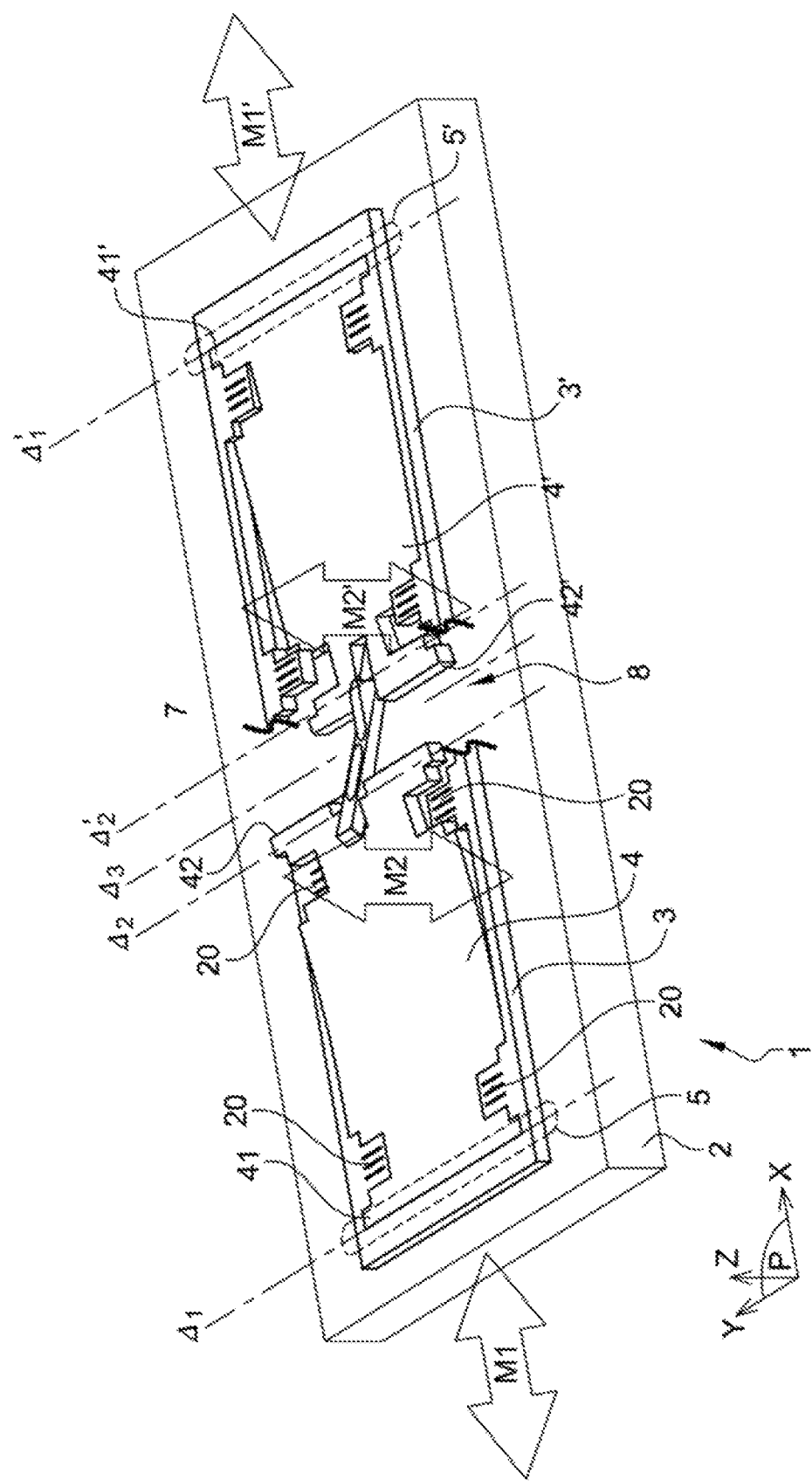
[Fig. 4]

[Fig. 5]
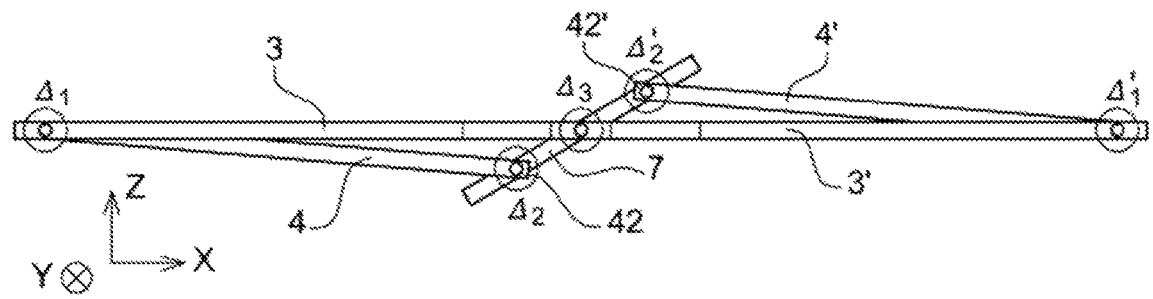
[Fig. 6]
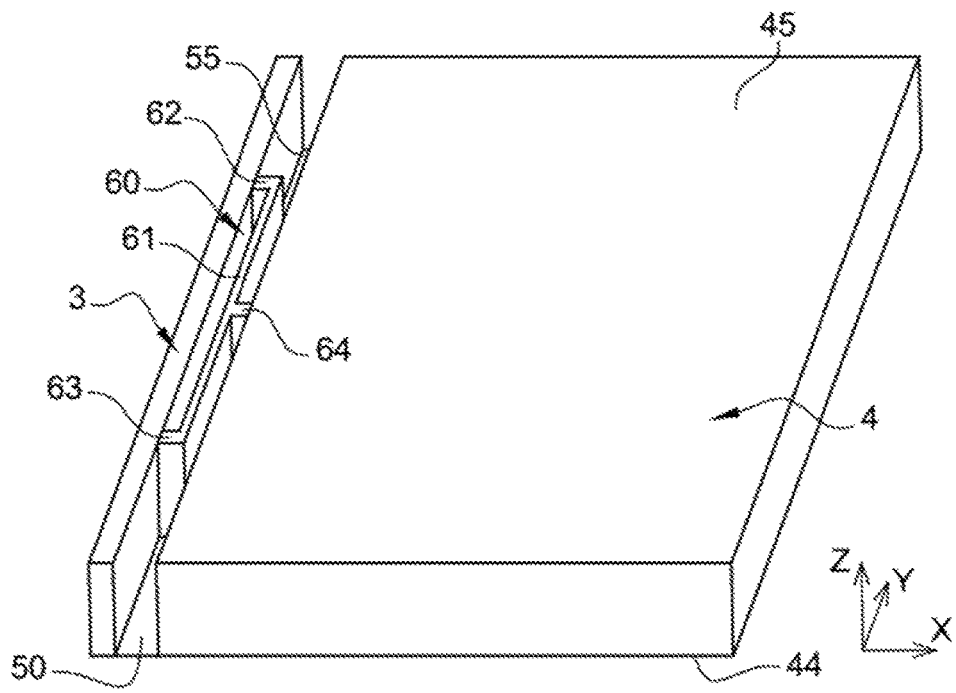

[Fig. 7]
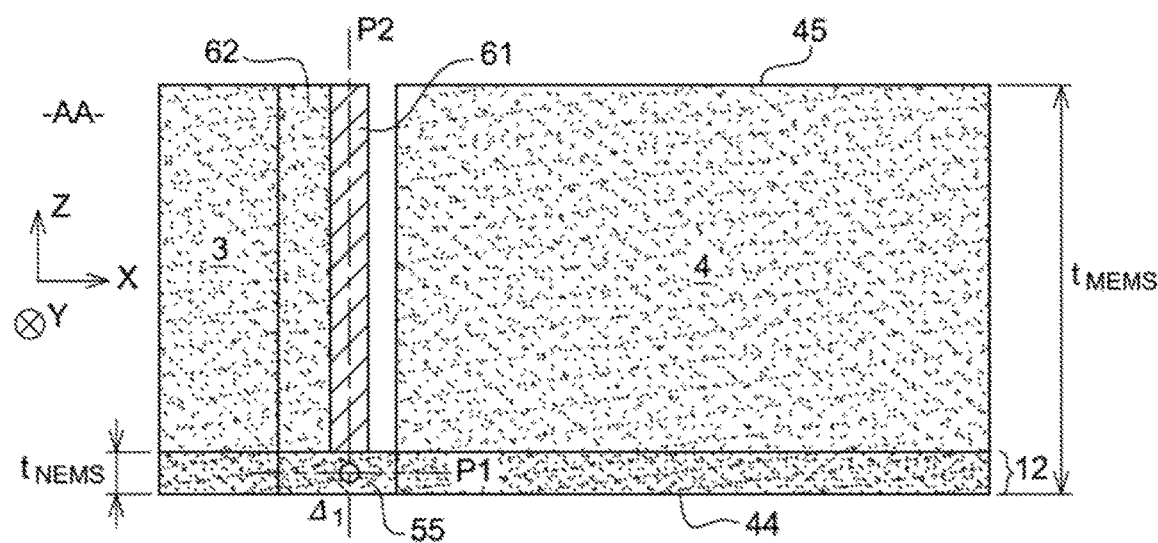

[Fig. 8]
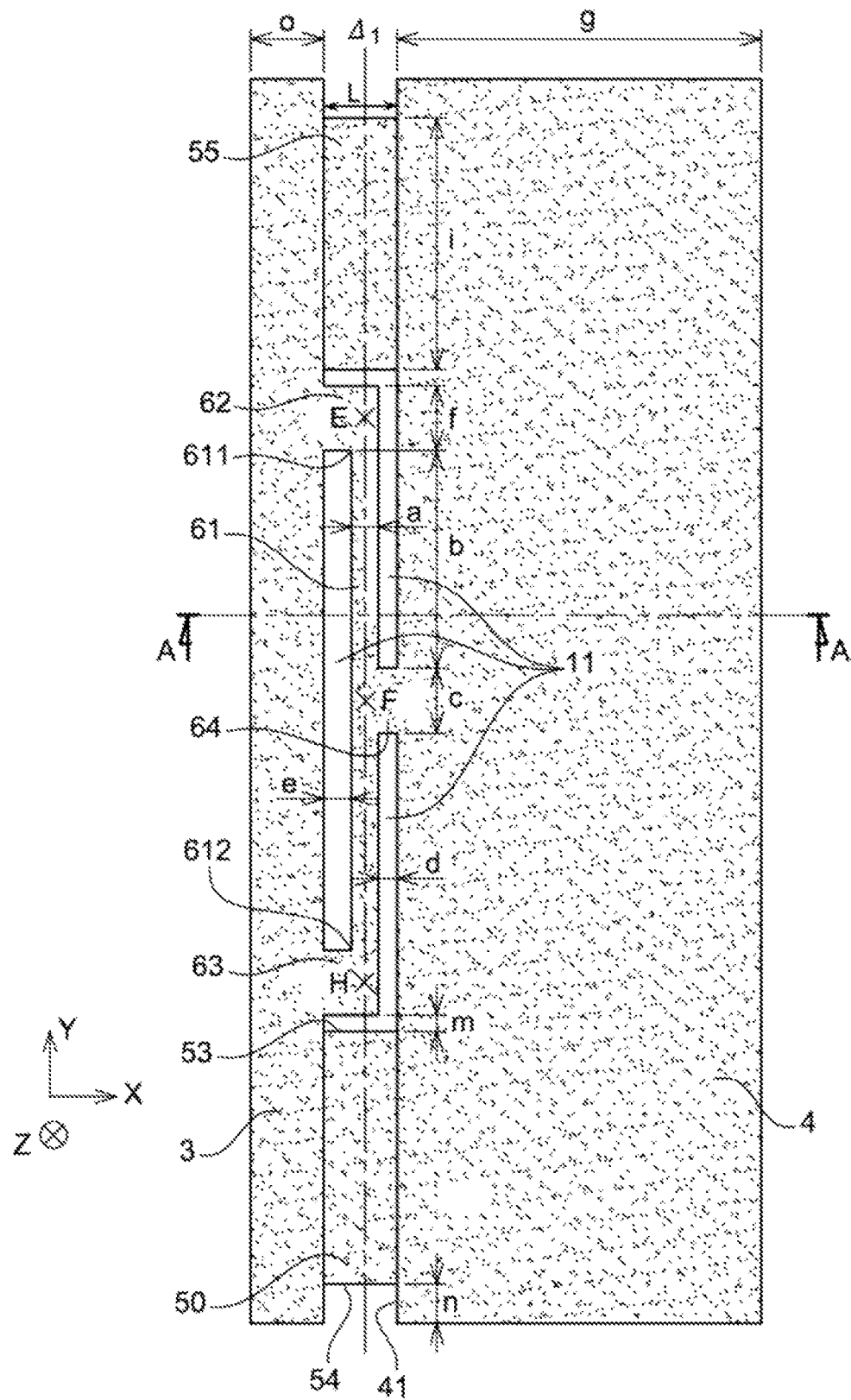

[Fig. 9]
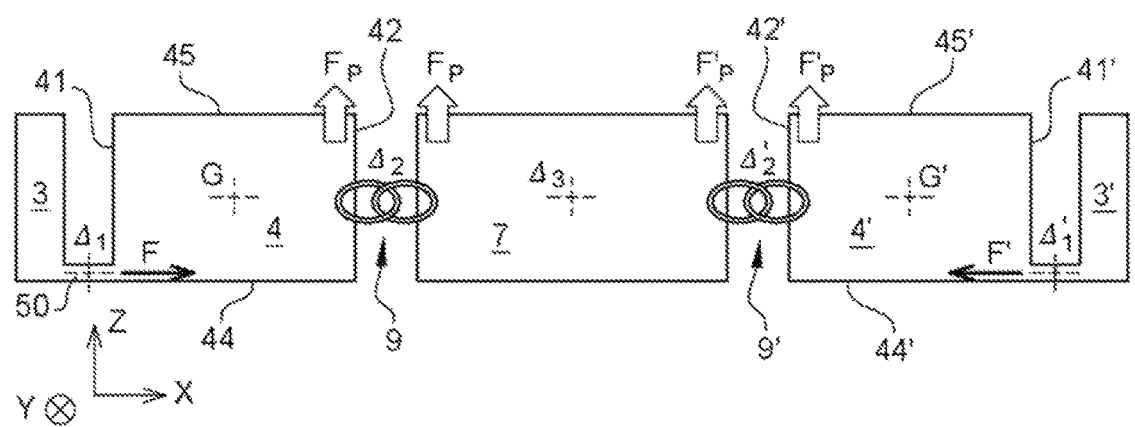

MEMS-TYPE INERTIAL SENSOR WITH SPECIFIC MECHANICAL LINK

CROSS-REFERENCE TO RELATED APPLICATIONS

This application claims priority to French Patent Application No. 2209981, filed Sep. 30, 2022, the entire content of which is incorporated herein by reference in its entirety.

FIELD

The technical field of the invention is that of micro-electro-mechanical systems (MEMS). The invention relates in particular to such a device used as an inertial sensor, and comprising a proof mass which can pivot relative to a frame or support under the effect of the forces it undergoes.

BACKGROUND

Different types of micro-electro-mechanical gyrometers have been developed in recent years, in particular "out-of-plane" movement gyrometers, such as the one schematically represented in FIG. 1, which make it possible to measure a speed of rotation about an axis Y parallel to the mean plane of the substrate from which the gyrometer $1aa$ is made.

Most of this substrate forms a thick layer that serves as a support $2aa$. The gyrometer $1aa$ comprises two movable frames $3aa$ and $3aa'$, each guided for displacement with respect to this support $2aa$, along an axis X which is parallel to the support $2aa$ (parallel to the substrate), and perpendicular to the rotation angular velocity measurement axis, Y. During operation of the gyrometer, the two frames are moved, for example by electrostatic actuation by means of interdigital combs (not represented), so as to oscillate parallel to the axis X, in phase opposition to each other (symmetrically). The two frames then move at speeds of displacement opposite to each other relative to the support $2aa$.

Each frame $3aa$, $3aa'$ drives a proof mass $4aa$, $4aa'$ (also called Coriolis mass) therewith, which is connected to the frame through a link allowing the proof mass to pivot about an axis of rotation (link axis) parallel to the axis Y. This link is therefore partly similar to a pivot connection, or in other words, a hinge.

When the gyrometer $1aa$ rotates (i.e.: when the support $2aa$ rotates) relative to an inertial reference frame (for example relative to the geocentric reference frame), about the axis Y, with an angular velocity $\vec{\Omega} = \Omega \vec{y}$, each mass $4aa$, $4aa'$ then undergoes a Coriolis force, which is expressed as $\vec{F}_{cor} = 2m_{cor}(\vec{v} \vec{x}) \wedge (\Omega \vec{y})$ where $m_{cor}$ represents the mass of any one of these two proof masses $4aa$, $4aa'$ and where v is its velocity of displacement (along the axis X). This ("out of plane") force is therefore directed along the axis Z and is of the same amplitude but in the opposite direction for the two proof masses $4aa$ and $4aa'$ (since the two masses are driven in opposite directions). For each mass, this force therefore causes an out-of-plane displacement of the mass, more precisely a displacement of one movable end of the mass, in a direction parallel to the axis Z. This force causes the mass to pivot about its axis of rotation (the axis of the mass-frame link). In this case, this out-of-plane displacement (this pivoting) occurs in an opposite direction for the two masses. The out-of-plane displacement of these two masses then causes a detection lever $7aa$ to rotate about a detection axis (parallel to the axis Y). This rotation of the lever is then measured, for example by virtue of strain gauges (piezoresistive, piezoelectric or resonant detection) to deduce the angular velocity $\Omega$. These gauges can be connected to the pivot detection lever on the one hand, and to the support on the other hand, and be arranged so as to stretch or compress when the lever pivots.

In a gyrometer such as this one, it is known to make the link, which connects one of the frames to the corresponding proof mass, by means of one or more torsion beams (FIGS. 2 and 3):
- each having a significant $t_{MEMS}$ thickness along the axis Z, to be rigid with respect to a displacement along the axis Z, in order to set the Z position of one end of the proof mass (to effectively fulfil a "hinge" function),
- and having a reduced extension (width) in a direction parallel to the axis X, to facilitate torsion of the beam about the axis Y and thus allow the mass to pivot about its axis of rotation without too much resistance.

FIGS. 2 and 3 show an exemplary embodiment of such a connection based on this principle. In this example, the link comprises four torsion beams $61aa$, $62aa$, $63aa$, $64aa$, each of which forms a sort of wall, parallel to the plane containing the axes Y and Z. The beams $61aa$ and $62aa$ are each connected (rigidly), on the one hand to the frame $3aa$, and on the other hand to a common, central island $65aa$. Similarly, the beams $63aa$ and $64aa$ are each rigidly connected, on the one hand to the mass $4aa$ (at its first "connected" end), and on the other hand to the central island $65aa$.

However, this type of connection is not completely satisfactory. It is desirable that the connection between the frame and the mass:
a) be able to transmit a force parallel to the axis Z, with little deformation in this direction, to set the Z position of one of the ends (or in any case of a given point) of the proof mass,
b) be able to transmit a force parallel to the axis X, with little deformation in that direction, so that the frame can drive the mass therewith, and
c) oppose rotation of the mass about its axis of rotation (pivot) as little as possible, with the least possible stiffness with respect to this rotation.

With regard to criterion c), it is noticed that sources of elastic stiffness opposing the rotation of the proof mass $4aa$ comprise: the rotational stiffness due to the link, as well as the stiffness of the strain gauge(s) (used to measure rotation of the proof mass about its axis of rotation), and possibly other sources of stiffness opposing such a rotation. However, it is desirable to minimise stiffness that is not due to the strain gauges themselves, so that as much energy as possible is directed towards the strain gauges in order to maximise the rotation measurement signal (in terms of detection and from an energy point of view, it is desirable to avoid storing energy—in the form of elastic energy—in the mass-frame link).

However, for a torsion beam such as beams $61aa$ to $64aa$, criteria b) and c) are partly antagonistic. Indeed, to make the beam very flexible in torsion (about the axis Y), its width a could be reduced enormously, but this would make the beam very little rigid with respect to displacement along the axis X.

More precisely, such a beam resists displacement of its end, in a direction parallel to the axis X, with a bending stiffness coefficient $k'_X$ which is proportional to $(t_{MEMS} a^3)/b^3$, where b is the length of the beam along the axis Y. And it opposes to a torsion around the axis Y with a torsional stiffness coefficient $C'_Y$ which is proportional to $(t_{MEMS} \underline{a}^3)/b$ (when $\underline{a}$ is very small relative to $t_{MEMS}$). Reducing the width a therefore has the effect of reducing the torsional stiffness, but also the flexural stiffness, whereas it would be desirable on the contrary to increase it (as it is useful, since it allows the mass to be driven by the frame).

It is possible, to a certain extent, to reduce both the width $a$ of the beam and its length b, in an attempt to obtain a high stiffness coefficient $k'_X$ while reducing $C'_Y$ (indeed, the ratio $k'_X/C'_Y$ is proportional to $1/b^2$). However, this leads to very small values of width $a$, which can cause manufacturing problems, especially in terms of reproducibility. Indeed, etching a block about twenty microns high (extension along the direction Z), to delimit in this block a wall less than 1 micron wide (extension of the beam in the direction X) and twenty microns high (20 microns thick) generally leads to a wall whose exact width is difficult to control precisely, this width varying further over the height (i.e.: over the thickness) of the wall in question, so that mechanical characteristics of the link are then difficult to control.

For a gyrometer such as that described above, there is therefore a need for a connection that performs better than the link of prior art described above, allowing in particular a better compromise between
- on the one hand, a high degree of stiffness with respect to a movement parallel to the direction of movement X and Z of the movable frame, and
- on the other hand, flexibility with respect to rotation about an axis parallel to the gyrometer detection axis (parallel to the axis Y).

SUMMARY

To remedy at least in part the limitations of prior art, an aspect of the present technology then relates to a microelectromechanical device comprising:
- a support,
- a movable frame, translationally guided with respect to the support along an axis of displacement parallel to a mean plane of the support,
- a proof mass, which extends from a first end to a second end of the proof mass,
  - its first end being connected to the movable frame through a mechanical link allowing the mass to pivot, relative to the frame, about an axis of rotation which is parallel to the mean plane of the support and perpendicular to the axis of displacement of the frame,
  - the proof mass being connected, on the side of its second, movable end, to a member for detecting pivoting of the proof mass about its axis of rotation,
in which device the connection comprises a thin wall which extends parallel to the mean plane of the support, from the frame to the first end of the proof mass, along a mean line which is parallel to the axis of displacement of the frame, and which, along an axis Z perpendicular to the mean plane of the support, has a thickness less than the thickness of the proof mass, or even less than one tenth of the thickness of the proof mass.

The mean line in question connects the frame to the first end of the proof mass. It is, for example, the neutral axis of the wall that connects these two elements.

Due to its low thickness along the axis Z, this wall is very flexible: its stiffness, with respect to bending about the axis of rotation of the proof mass (and therefore with respect to rotation of the mass about this axis), is very low.

On the other hand, as this connecting wall extends along a mean line which is parallel to the axis of displacement of the frame, it works in compression or extension, when transmitting movements parallel to this axis, and is therefore very rigid with respect to the transmission of such movements (or with respect to the transmission of forces parallel to this axis).

Connecting the mass to the frame by means of such a wall therefore makes it possible to obtain a very good compromise between criteria b) and c) mentioned above.

More precisely, for the transmission of movements parallel to the axis of displacement of the frame, such a wall has a stiffness coefficient $k_X$ (compression/extension stiffness) which is proportional to $(l \cdot ep)/L$, where:
- l is the width of the wall, i.e. its extension parallel to the axis of rotation of the mass (axis of the link),
- ep, also noted $t_{NEMS}$ later, is the thickness of the wall along the axis Z, and
- L is the length of the wall, that is its extension parallel to the axis of displacement of the frame (L corresponds, for example, to the distance separating the frame from the first end of the proof mass).

On the other hand, the stiffness of this wall with respect to bending, about the axis of rotation of the mass, is associated with a stiffness coefficient $C_Y$ which is proportional to $(l \cdot ep^3)/L$. It is therefore possible to obtain both a high stiffness coefficient $k_X$ and a low stiffness coefficient $C_Y$ by using such a wall, which is fairly short (L is small), with a fairly large cross-section $l \cdot ep$, and a small thickness ep. Indeed, the $k_X/C_Y$ ratio is proportional to $1/ep^2$ (instead of $1/b^2$ in the link of prior art set forth above), and the thickness ep can be very small while being very well controlled since it is the thickness of an element parallel to the mean plane of the support (parallel to the mean plane of the substrate), derived for example from a layer obtained by planar technology or from a Si-top layer of an SOI substrate (this connecting wall is typically formed in a NEMS layer of the device). It is easier to control the thickness, regularity and reproducibility of such a layer than the reduced "width" of a thin and very "high" wall (significant thickness) obtained by etching a block, perpendicular to the mean plane of this block. This configuration therefore makes it possible, among other things, to solve the manufacturing difficulties mentioned above (and this thin layer may also be necessary for the production of measuring gauges).

In addition to the wall mentioned above, the connection in question may include a retaining element including a retaining wall:
- which is perpendicular to the mean plane of the support,
- which, along a direction parallel to the axis of displacement of the frame, has an extension (hereinafter referred to as the width of the retaining wall) of less than a quarter of the thickness of the retaining wall along the axis Z,
- and which connects on the one hand to the movable frame, and on the other hand to the first end of the proof mass.

As this retaining wall is parallel to the axis Z and has a significant height (i.e. thickness) along the axis Z, it is rigid with respect to a displacement of one of its ends parallel to the axis Z (in the manner of a flat ruler, the plane of which would be vertical, perpendicular to the mean plane of the support); it therefore makes it possible to set the Z position of the first end of the proof mass, and therefore makes it possible to fulfil the mechanical link criterion a) mentioned above, in the background section. In particular, this retaining wall prevents deformation of the connecting wall described above under the effect of forces parallel to Z.

And as the retaining wall is not very thick, it remains torsionally flexible with respect torsion about the axis of rotation of the mass. In this respect, as the function of rigidity along the axis X is provided by the first wall, mentioned above (wall parallel to the mean plane of the support), the width or length of this second retaining wall can be freely reduced (thus reducing its torsional stiffness). And the possible variability (difficulty of control) of the width of this retaining wall, when this width is very small, is not a problem here, precisely because this second wall is not intended to transmit forces in the direction X (in other words, this variability is no longer a problem because the stiffness is so reduced that it becomes negligible compared with the others, especially that due to the gauges. The variation of something negligible has no high-level consequences).

Employing these two thin walls, one parallel to the mean plane of the support, and the other perpendicular to it, therefore makes it possible to decouple the functions of the connection to be produced and thus obtain a better compromise between the different restrictions a) to c) mentioned above.

The configuration set forth above, in which the forces parallel to the axis X are transmitted by this first wall, which is thin and parallel to the support, offers many improvements, as explained above.

On the other hand, at first sight this configuration appears problematic in terms of detection for this inertial sensor type device.

In practice, the first wall, parallel to the mean plane of the support, most often extends from either a lower face or an upper face of the inertial mass. In general, it extends from the lower face of the inertial mass (the face on the support side), and is derived from a Si-top layer of an SOI substrate (while the mass and the frame itself are etched in a thick layer deposited onto this Si-top layer).

Forces parallel to the axis X, transmitted by the link, are therefore transmitted at a lower (or upper) face of the proof mass. These forces do not therefore pass through the centre of mass of the proof mass, and induce a torque which therefore tends to make this mass rotate about its axis of rotation. In practice, this undesirable effect can be very significant, because the forces transmitted parallel to the axis X are often much greater than the Coriolis forces to be detected (by way of example, the amplitude of oscillation along the axis X can be around ten microns, whereas the out-of-plane displacement of the free end of the proof mass is, for example, in the order of 0.1 micron, or even less).

This undesirable effect, due to the torque of the forces transmitted by the link can nevertheless be compensated for, and even cancelled out, by the use of a second frame-mass assembly, symmetrical to the frame-mass assembly set forth above, the two proof masses then being connected to the same pivot detection member, in this case a lever, respectively on one side and the other side of this lever.

It will be noted that the fact that this configuration with double frame and common lever makes it possible to compensate for this undesirable moment of force (due to the vertical offset of the axis of rotation of the link in relation to the centre of gravity of the mass) is not, however, immediate, and requires careful analysis of the mechanical forces involved, schematically represented in FIG. 9.

Be that as it may, the device may be of the gyrometer type, the frame, proof mass and link mentioned above being referred to respectively as the first frame, first proof mass and first link, the device then further comprising:

a second movable frame, translationally guided with respect to the support according to the axis of displacement, a second proof mass, which extends from a first end to a second end of the second proof mass, the second end being located on the side of the first proof mass while the first end is located opposite to it, the first end of the second mass being connected to the second frame through a second mechanical link identical to the first link, the second proof mass being connected, on the side of its second movable end, to the same pivot detection member as the first proof mass, the detection member being a lever, rotatably movable about a detection axis of rotation which is parallel to the axis of rotation of the first proof mass, the lever being connected on one side to the first proof mass, and on the other to the second proof mass.

As used herein, the term "first end", like the term "second end", does not necessarily refer to a terminal end of the proof mass (that is located at the very end of the proof mass and terminating that proof mass). Stated differently, the first end may delimit the proof mass in a zone which is not located entirely at the end of this mass (and similarly for the second end). But in any case, the first and second ends are located opposite to each other (i.e. on either side) in relation to the centre of mass (centre of gravity) of the proof mass. The first end, as well as the second end is for example located closer to a terminal end of the proof mass than to the centre of mass of the proof mass. It may also correspond directly to the terminal end of the proof mass.

Furthermore, by connection it is meant an element, or a set of elements guiding movement of the proof mass in relation to the frame (i.e.: arranged to hinge the mass with the frame).

By detection device, it is meant a mechanical part (in practice, a micro-part) driven by the second end of the proof mass, or an electromechanical transducer (for example a strain gauge) connected to this end and whose electrical characteristics vary during the displacement of the second end in a direction parallel to the axis Z, or an assembly comprising such a part and such a transducer.

By wall, it is meant an element delimited by two free surfaces substantially parallel to each other (parallel to better than 15 degrees) and separated by a distance smaller than, and even significantly smaller than, the dimensions of these free surfaces. In other words, it is an element (not necessarily planar) whose surface area is significantly greater than the distance between the two free surfaces of the wall (i.e. significantly greater than the area of the element along a transverse direction).

In this document, for the first wall as well as for the second wall, the term "thickness" refers to the extension of the wall along the direction Z, perpendicular to the layers (perpendicular to the substrate).

Furthermore, in this document, "parallel" (and "perpendicular") means parallel (or, respectively, perpendicular) to better than 15 degrees, or even to better than 5 or even 1 degree.

Further to the characteristics mentioned above, the device just set forth may include one or more of the following optional characteristics, considered individually or according to any technically contemplatable combinations:

the thickness of the wall, parallel to the mean plane of the support, is less than one thirtieth of the thickness of the proof mass; the wall is connected to the frame along a connection line which is parallel to the axis of rotation of the proof mass; the wall is connected to the proof mass along another connection line which is also parallel to the axis of rotation of the proof mass; the wall is delimited laterally, on either side, through two free edges each of which extends from the frame to the proof mass; each of these two free edges is parallel to the axis of displacement of the frame; neither of these two edges is parallel to the axis of rotation of the proof mass;

the proof mass is delimited by a lower face, located on the side of the support, and, on the other side, by an upper face; the wall, parallel to the mean plane of the support, extends from the lower face of the proof mass;

the device comprises a micro-electromechanical actuator configured to impose oscillation to the movable frame along the axis of displacement;

the proof mass defines a mean plane, which is parallel to the mean plane of the support when the mass is at rest;

the support of the device is formed by a layer, for example of semiconductor material, thicker than the frame or the proof mass; the mean plane of the support is the plane defined by this layer;

the retaining wall is planar; the retaining wall is perpendicular to the axis of displacement of the movable frame;

the retaining wall is delimited, on the support side, by a free lower edge, and by an also free upper edge, opposite thereto.

the extension of the retaining wall along a direction parallel to the axis (X) of displacement of the frame is less than a tenth, or even a twentieth, of a length, that this wall has along a direction parallel to the axis of rotation, between a point of connection to the movable frame and a point of connection to the proof mass;

the extension of the retaining wall along a direction parallel to the axis (X) of displacement of the frame is less than one tenth of its thickness (height);

the retaining wall extends in a direction parallel to the axis of rotation of the proof mass, from a first end to a second end of the retaining wall, and:

the first end and the second end of the retaining wall are both connected to the movable frame, while the proof mass connects to the retaining wall in a median zone of the wall, between these two ends, or, the first end and the second end of the retaining wall are both connected to the proof mass, while the frame connects to the retaining wall in a median zone of the wall, between these two ends, the retaining wall extends in a direction parallel to the axis of rotation of the proof mass, from a first end to a second end of the retaining wall, the first end of the retaining wall being connected to the movable frame while its second end is connected to the proof mass, or vice versa;

the device comprises at least one additional retaining wall, which is perpendicular to the mean plane of the support, which has, along a direction parallel to the axis of displacement of the frame, an extension of less than a quarter of the thickness of the retaining wall along the axis Z, and which extends, in a direction parallel to the axis of rotation of the proof mass, from a first end to a second end of the additional retaining wall, the first end of the additional retaining wall being connected to the movable frame while its second end is connected to the proof mass, or vice versa;

the retaining wall and the additional retaining wall are symmetrical to each other, with respect to a plane of symmetry of the frame and the proof mass, which plane of symmetry is parallel to the plane X,Z;

the wall, parallel to the mean plane of the substrate, is formed by a portion of a thin silicon top layer of a silicon-on-insulator SOI substrate, and the support of the device is formed by a thick support layer of the SOI substrate;

over most of its thickness, the proof mass is formed of silicon, (which may be polycrystalline, or monocrystalline, deposited on the thin silicon top layer);

the thin top layer of the SOI substrate is essentially monocrystalline;

the link connecting the detection lever to the first proof mass, and the link connecting the detection lever to the second proof mass are located opposite to each other with respect to the detection axis of rotation;

the device comprises an electromechanical actuation system configured to impose oscillation to each of the movable frames along the axis of displacement, the displacement of the first frame relative to the support and the displacement of the second frame relative to the support having the same amplitude and opposite directions to each other.

The present technology and its different applications will be better understood upon reading the following description and upon examining the accompanying figures.

BRIEF DESCRIPTION OF THE FIGURES

The figures are set forth by way of indicating and in no way limiting purposes.

FIG. 1 schematically represents a gyrometer with two movable frames of prior art.

FIG. 2 schematically represents a mechanical link of the gyrometer of FIG. 1, this link connecting one of the movable frames to a proof mass of the gyrometer, this link being represented in a perspective view and in a situation where the frame pulls on the proof mass to movably drive it therewith.

FIG. 3 is a schematic representation of the link of FIG. 2, in a top view.

FIG. 4 is a schematic perspective representation of a gyrometer with two movable frames implementing the present technology.

FIG. 5 schematically represents part of the gyrometer of FIG. 4, in a side view.

FIG. 6 is a schematic perspective representation of a mechanical link of the gyrometer of FIG. 4, this link connecting one of the movable frames to a proof mass of the gyrometer.

FIG. 7 is a partial schematic representation of the link of FIG. 6, in a cross-section view along a sectional plane AA marked in FIG. 8.

FIG. 8 is a schematic representation of the link in FIG. 6, in a top view.

FIG. 9 schematically represents forces transmitted by links of the gyrometer of FIG. 4.

DETAILED DESCRIPTION

FIGS. 4 and 5 show a gyrometer-type device 1 implementing the present technology. This gyrometer 1 is a double-frame gyrometer with out-of-plane movement, which makes it possible to measure a speed of rotation about an axis Y parallel to the mean plane of the substrate from which the gyrometer 1 is made.

Most of this substrate forms a thick layer that serves as the support 2.

The gyrometer 1 comprises two movable frames 3 and 3', each of which is guided in displacement, relative to this support 2, along an axis X which is parallel to the mean plane P of the support, a mean plane which is also the mean plane of the gyrometer itself, which is overall planar. The axis of displacement of the frames, X, is additionally perpendicular to the axis of measurement of the angular speed of rotation, Y. The axis of displacement of the frames, X, and the axis of measurement of the angular speed, Y, are shown in the different figures, as is an axis Z, perpendicular to the mean plane of the support (perpendicular to X and Y).

For each frame, the guidance of the frame relative to the support is achieved by virtue of four springs 20, for example, arranged at four points of the frame remote from each other, each spring 20 connecting the frame to the support and allowing relative movement parallel to the axis X. The springs 20 herein comprise leaves working in flexion, which connect the support 2 to the frame 3, 3' in question. The frames 3 and 3' are herein overall rectangular in shape.

During operation of the gyrometer, the two frames are moved, for example by electrostatic actuation by means of interdigital combs (not represented), so as to oscillate parallel to the axis X, in phase opposition to each other (symmetrically). The two frames then have directions of displacement, relative to the support 2, which are opposite to each other.

The two frames 3 and 3' are arranged opposite to each other, on either side of a fixed central portion 8 (i.e. without movement relative to the support 2) of the gyrometer. In FIG. 4, the detail of this central portion 8 is not represented, for the sake of clarity of the figure. Stated differently, FIG. 4 is a partial view. The boundary between non-represented parts and represented parts is marked on the figure by three thick, wavy lines.

Each frame 3, 3' drives a proof mass 4, 4' (also called Coriolis mass) therewith, which is connected to the frame through a link 5, 5' which allows the proof mass to pivot about an axis of rotation Ai, Si parallel to the axis Y. This link is partly similar to a pivot connection, or in other words, a hinge. As will be seen below, the link 5, 5' is very rigid with respect to relative movements directed along the axis X between the mass and the frame. As a result of this strong coupling, for the oscillating movement of each mass-frame assembly, relative to the support, parallel to the axis X, almost a single resonance frequency is obtained, typically between 1 and 100 kHz (or even between 5 and 50 kHz).

As can be seen in FIG. 4, each proof mass 4, 4' here has an overall shape which is that of a plate (approximately parallelepipedal), parallel to the mean plane P of the support 2 when the mass is at rest. This plate is surrounded by the corresponding frame over most of its perimeter. Each mass 4, 4' extends from a first end 41, 41' to a second end 42, 42'. The mean axis of the proof mass 4, 4', which connects its first end to its second end, is parallel to the axis of displacement, X. Each mass 4, 4' is delimited, on the side of the support 2, by a lower surface 44, 44' (parallel to the support when the mass is at rest) and, opposite to this, by an upper surface 45, 45'.

The first end 41, 41' is connected to the frame 3, 3' through the link 5, 5' in question, while the second end 42, 42' of the mass can move "out of plane", along a direction parallel to the axis Z, when the mass 4, 4' pivots about its axis of rotation $\Delta_1$, $\Delta'_1$.

For each mass 4, 4', the first end 41, 41' is located, relative to the rest of the proof mass 4, 4', opposite to the other proof mass 4', 4 (and therefore opposite to the other frame 3'). While the second end 42, 42', on the other hand, is located on the side of the other proof mass 4', 4 virtually opposite to the other mass, in a central zone of the gyrometer 1. In other words, each proof mass 4, 4' is connected to its frame 3, 3' (through the link 5, 5') on the somewhat outer side of the frame, on a side of this mass opposite to the other proof mass 4', 4.

Each proof mass 4, 4' is connected, on the side of its second end 42, 42', to a common rotation detection lever 7. This lever 7 pivots about a detection axis 43, which is parallel to the axis Y and is fixed with respect to the support 2. Lever 7 is located in the central zone of the gyrometer, between the two proof masses.

When the gyrometer 1 rotates (i.e.: when the support 2 rotates) with respect to an inertial reference frame, for example with respect to the geocentric reference frame, about the axis Y, with an angular velocity $\vec{\Omega}=\Omega\vec{y}$, each mass 4, 4' then undergoes a Coriolis force, which is expressed as $\vec{F}_{cor}=2m_{cor}(\vec{v}\vec{x})\wedge(\Omega\vec{y})$ where $m_{cor}$ represents the mass of any one of the proof masses 4, 4' and where v is its speed of displacement (along the axis X). This force is therefore directed along the axis Z and is of the same amplitude but in the opposite direction for the two proof masses 4 and 4' (since the two masses are driven in opposite directions). For each of these two masses, this force therefore causes displacement of its second end 42, 42', along the axis Z (or, stated differently, pivoting of the mass about its axis of rotation $\Delta_1$, $\Delta'_1$), in an opposite direction for the two masses 4, 4', which then causes the detection lever 7 to rotate about the detection axis $\Delta_3$ (see FIG. 5). This rotation of the lever is measured, here by virtue of strain gauges (piezoresistive, piezoelectric, or resonant detection) to deduce the angular velocity $\Omega$ thereof.

In FIGS. 4 and 5, the amplitude of displacement along the axis Z is exaggerated (i.e. this displacement is not represented to scale), to make it clearly visible. In practice, the amplitude of oscillation of the frames, along the axis X, is in the order of about ten microns (which is very high, for a MEMS), while the displacement, along the axis Z, of the second ends of the masses is, for example, in the order of 0.1 micron. In these figures, the displacement of the frames and masses along the axis X is schematically represented by the double arrows M1 and M1', while the displacement along the axis Z of the second ends of the masses is depicted by the double arrows M2 and M2'.

Each link 5, 5' has some stiffness, opposing to a rotation of the corresponding proof mass 4, 4' about the axis $\Delta_1$, or $\Delta'_1$. To this rotational stiffness must be added the stiffness of the strain gauges and the rotational stiffness of the link 9, 9' between the mass 4, 4' and the lever 7. The rotational movement of the mass 4, 4' about its axis of rotation $\Delta_1$, $\Delta'_1$ is associated with a resonance frequency, chosen for example so as to be close to (slightly higher, for example by 1 to 10%, than) the resonance frequency of the frame-mass assembly in its oscillation parallel to X. This makes it possible to obtain a larger angular velocity measurement signal $\Omega$.

In any case, the overall architecture of the gyrometer, with two proof masses 4 and 4' which oscillate symmetrically and which actuate the same rotation detection lever 7, is particularly interesting because it allows differential detection of the angular speed of rotation $\Omega$, which greatly improves the signal-to-noise ratio of this gyrometer 1. Indeed, any mechanical vibrations to which the gyrometer 1 may be subjected, for example in the direction X or in the direction Z, have the same influence on the mass 4 and on the mass 4'. In other words, they cause a parasitic displacement which is identical for these two masses (for example in the direction +Z for both masses), and which therefore has no influence on the detection lever 7 (i.e. does not cause this lever to pivot). This architecture therefore provides effective rejection of these parasitic vibrations, directly at the mechanical detection device 7, even before electromechanical conversion by the gauges.

The fact that, for each mass, the link 5, 5' on the one hand, and the mass rotation detection device 7 on the other hand, are uncoupled (the two being arranged respectively at two different ends of the mass), means that each of these two elements can be configured independently of the other, with a great deal of freedom.

The connections 5 and 5' are now described in more detail. These two connections are identical here, so that only link 5 is described in detail (with reference to FIGS. 6 to 8).

This link 5 comprises at least:
- a first wall 50, also called the connection wall, or transmission wall, parallel to the mean plane P of the support 2; this wall allows the frame 3 to drive the mass 4 therewith, with high rigidity in the direction X, and
- a second wall, 61, also called a retaining wall, perpendicular to the mean plane of the support, and which sets the Z position of the first end 41 of the proof mass.

As can be seen in FIG. 8, the link 5 also comprises a third wall 55, parallel to the mean plane of the substrate. The connection thus comprises two transmission walls (in a way as if this wall were divided into two parts, instead of being in one piece). Alternatively, the connection could additionally comprise a different number of transmission walls or retaining walls. For example, in the example of FIG. 8, the link 5 comprises a single retaining wall (wall 61). However, alternatively, it could comprise two separate retaining walls, or even more than two, all the retaining walls being beneficially symmetrical with respect to a plane of symmetry which is parallel to the axes X and Z (and which is also a plane of symmetry for the mass and the frame). Each of these retaining walls is thin (in the sense given below for the wall 61), parallel to the axis Z, perpendicular to the axis X, and is connected on the one hand to the frame, and on the other hand to the proof mass.

The first, second and third walls 50, 61 and 55 each connect the first end 41 of the mass 4 to the frame 3, more precisely to a part of this frame which corresponds to one of the sides of this rectangular frame, a side which is parallel to the axis Y. These three walls thus connect:
- a face, which this part of the frame has, and which is perpendicular to the axis X,
- to the first end 41 of the mass 4, which first end forms an end face, also perpendicular to the axis X (these two faces being separated by a kind of slot).

The walls 50 and 55 each have a thickness noted $t_{NEMS}$. This is their extension parallel to the axis Z. This thickness is less than, and even significantly less than, the thickness $t_{MEMS}$ of the proof mass (extension of the proof mass along the axis Z). The thickness $t_{NEMS}$ of these walls may, for example, be less than one tenth, and even one thirtieth, of the thickness $t_{MEMS}$ of the proof mass. $t_{NEMS}$ is, for example, less than 2 microns, or even 1 micron or even 0.5 micron. As for $t_{MEMS}$, it is for example between 5 and 100 microns, or between 15 and 50 microns.

The walls 50 and 55 each extend from the lower face 44 of the proof mass 4.

Walls 50 and 55 may each be formed by a portion of a thin silicon top layer 12 of a silicon-on-insulator (SOI) substrate from which the gyrometer is manufactured.

Such an SOI substrate comprises a thick support layer (generally at least 100 microns thick, generally more), covered with an insulating layer, generally of silicon oxide, itself covered by the thin silicon top layer, often called the Si-top layer. This Si-top layer is manufactured to a reduced thickness (250 nm, for example) and is very well controlled. It is therefore suitable for producing transmission walls 50 and 55. It is additionally essentially monocrystalline, and therefore suitable for producing piezoresistive gauges. Here, the gauges are made in this layer 12. During the manufacture of the gyrometer, an additional layer of silicon (more generally, of semiconductor material), fairly thick, of thickness $h=t_{MEMS}-t_{NEMS}$, is deposited onto the layer 12, to form the bulk of the proof masses and frames (with a total thickness $t_{MEMS}$). This additional layer may be polycrystalline or monocrystalline, and its thickness h is typically a few microns or tens of microns. During manufacture of the gyrometer, the layer 12 and this additional layer are etched to define the different elements of the gyrometer. The silicon oxide layer mentioned above, located under the NEMS layer 12, is removed (by chemical etching) especially under the parts of the gyrometer that are movable in relation to the support (frames and test weights in particular), to release these movable parts. Once manufactured, the thick support layer of the SOI substrate forms the support 2 of the gyrometer.

It is noticed that the walls 50 and 55 are in a way obtained by cutting the layer 12 laterally. Their thickness is therefore set by the initial thickness of layer 12; this reduced thickness does not result from a local refinement or etching of a thicker layer (in other words, it is not obtained by partial etching). Its thickness is therefore very well controlled, and any "over-etching" of the edges has only a limited influence on the stiffness of the mechanical link).

The third wall 55 is here identical to the first wall 50, so that only the geometry of the first wall is now described in more detail.

This first wall 50 extends, from the frame 3 to the first end 41 of the proof mass, along a mean line which is parallel to the axis X. The mean line in question connects the frame 3 to the first end 41 of the proof mass 4 (this mean line corresponds, for example, to the line (not necessarily rectilinear) which passes through the centres of the different straight sections of the wall 50). The junction between the first wall 50 and the frame 3 corresponds to a very elongated rectangular connecting surface which extends parallel to the axis of rotation Ai of the proof mass 4. The junction between the first wall 50 and the proof mass 4 also corresponds to a rectangular, very elongated connection surface extending parallel to the axis of rotation of the proof mass. The first wall 50 is delimited laterally, on either side, by two free edges 53, 54 (that is which are not connected, in any case not directly, to another element), which each extend from the frame 3 to the proof mass 4. Each of these two free edges, 53, 54 is parallel to the axis of displacement of the frame, X (and neither of these two edges is parallel to the axis of rotation of the proof mass).

The first wall 50 has a length L, along the axis X (this is the distance between the side of the frame 3 connected to the mass 4, and the first end 41 of this mass). In practice, it is between 5 and 50 microns, for example, and is chosen to be rather short, if possible (to increase the stiffness coefficient $k_X$, set forth in the "summary" section). As already indicated, the width of the wall 50, that is its extension parallel to the axis of rotation of the mass (axis of the link 5), is noted l. It is between 5 and 200 microns, for example (more generally, the sum of the widths of the different transmission walls (here 50 and 55) is between 10 and 500 microns), and is chosen to be large if possible, to increase the stiffness coefficient $k_x$. It will be noted that, in this document, by convention, for the first wall of the link 5, 5' (i.e.: for the thin wall $t_{MEMS}$, and which is parallel to the plane of the layers), the term "length" (herein the length L) designates the extension of the first wall along a direction parallel to the axis X of displacement of the frames, whereas the term "width" (in this case the width l) designates its extension along a direction parallel to the axis of rotation Y. It will be noted in this respect that the distance (L), referred to as the length of the first wall, may be smaller than the distance (l) referred to as the width of the first wall. Furthermore, this lexical convention relates to the first wall, but not necessarily to the other walls of the device (in particular not the retaining wall).

The second retaining wall 61 and the retaining element 60 of which it forms part are now described in more detail.

The second wall 61 is connected on the one hand to the frame 3, and on the other hand to the first end 41 of the proof mass 4. This wall is here planar. It is perpendicular to the axis X. This wall is thin: its width a (extension along the axis X) is less than one quarter, and even less than one tenth, of its thickness h. Its width a is also less than one tenth, or even one thirtieth, of a length, b, that this wall has along a direction parallel to the axis of rotation $\Delta_1$, between a point of connection (E) to the movable frame 3 and a point of connection (F) to the proof mass 4. The width a is, for example, between 0.5 and 5 microns (and is generally less than 2 microns). The length b is, for example, between 10 and 100 microns, and the height h is typically between 5 and 100 microns.

The retaining wall 61 extends, in parallel to the axis Y, from a first end 611 to a second end 612. These two ends are connected here to the frame 3 (respectively through a first, short connecting wall 62 and by a second, short connecting wall 63, also called connecting elements), both parallel to the axis Z. The proof mass 4, for its part, is connected to the retaining wall 61 in a median zone of this wall, located between the two ends 611 and 612 (halfway between these two ends), again by means of a short connecting wall 64, parallel to the axis Z.

Alternatively, the retaining wall could be connected differently to the movable frame and the proof mass. By way of example, its two ends could be connected to the mass, the frame then connecting to a median part of the wall (instead of vice versa). And, as indicated above, the connection could comprise several thin retaining walls perpendicular to the axis X.

The retaining wall 61 is delimited, on the support side, by a free lower edge, and by an also free upper edge, opposite thereto.

The retaining element 60, which comprises the retaining wall 61 and the three connecting elements 62, 63, 64, is not in contact with the transmission walls 50 and 55. The retaining element 60 is produced by etching:
- the aforementioned additional silicon layer, over the entire height of this layer,
- as well as the NEMS layer 12 located underneath (unless this layer has been previously removed, in this zone).

This etching thus produces openings 11 (in the form of fairly narrow slots) which extend over the entire height of the proof mass.

Here, on the side of the first end 41, the proof mass 4 and the frame 3 are connected to each other only by the transmission walls (50 and 55) and by the retaining element 60.

As explained in the "summary" section, this link 5 based on at least two thin walls, one, 50, parallel to the mean plane of the support, and the other, 61, perpendicular thereto, makes it possible to obtain a link which is very stiff in the direction of displacement of the frame (axis X), and also very stiff in the direction Z, thus defining the axis of rotation of the proof mass 4 with respect to the frame 3 (axis $\Delta_1$), while being flexible, with reduced stiffness, with respect to rotation about this axis.

In this respect, it should be reminded that the retaining wall 61, because of its large height (along the axis Z), couples the mass to the frame with a very high degree of stiffness in Z, and thus helps to define an axis of rotation (no movement other than rotation) between the two parts, this axis being in this case the axis $\Delta_1$. This wall forces points E, F and H, shown in FIG. 8, to have the same, or virtually the same, Z position (these three points being located respectively at connection element 62, connection element 64 and connection element 63, on the free upper face of the retaining element 60).

As the walls 50, 55 and 61 are thin (in the sense defined above), very rigid in the direction X for the walls 50 and 55, and very rigid in the direction Z for the wall 61, the axis of rotation Ai is located here at the intersection between (FIG. 7):
- a plane P1 which is the mean plane of the walls 50, 55 (and which is parallel to plane P), and
- a plane P2 which is the mean plane of the wall 61.

This axis of rotation is therefore located here at the NEMS layer 12 (very low torsional rigidity of the wall 61).

FIG. 9 schematically represents the gyrometer 1, in a sort of functional form, showing some of the forces exerted in links of the gyrometer. As frames 3 and 3' are actuated in phase opposition to each other:
- the force F transmitted by the link 5 as a result of frame 3 driving the mass 4 therewith (a force which is parallel to X),
- is of the same magnitude but opposite to the force F', transmitted by the link 5' as a result of the frame 3' driving the mass 4' therewith.

These two forces F and F' are exerted on the masses 4 and 4' almost at their lower faces 44 and 44'. They are therefore exerted on these masses with a non-zero lever arm in relation to the centre of mass, G, G' of the mass considered, and therefore tend to cause this mass to pivot about its axis of rotation, possibly much more than the Coriolis force to be detected. But this undesirable effect is counteracted by the use of the common lever 7.

Indeed, in terms of forces, this non-zero moment of forces F and F' translates, at the links 9 and 9', into forces Fp and F'p both directed along the axis +Z, and of the same amplitude. The links 9 and 9' are links which connect mass 4 and mass 4' respectively to lever 7. The purpose of these links, which are to transmit displacements parallel to the axis Z to the lever, is to transmit these forces Fp and Fp' without virtually modifying them. The detection lever 7 is thus subjected, at its two opposite ends, to two equal forces Fp and F'p, so that the combination of these two forces does not tend to cause the lever 7 to rotate about its axis of rotation As (located in the middle of the lever, and fixed relative to the support). Finally, even if the forces transmitted in the links 5 and 5' have a non-zero lever arm with respect to the centres of mass G and G' of the proof masses, they do not interfere with the measurement of the angular velocity $\Omega$, in this device.

A complete numerical example is now set forth, by way of example. The dimensions of the different elements in the link 5 are shown in FIG. 8. The values of these dimensions are given in Table 1, in micron.

The values of the stiffness coefficients $k_X$ and $C_Y$ corresponding to this dimensioning, which values are obtained by numerical simulation, are given in Table 3.

A numerical example corresponding to the link of prior art in FIG. 3 is also set forth by way of example. The dimensions of the different elements in this connection are shown in FIG. 3. The values of these dimensions are given in Table 2, in micron. The values of the stiffness coefficients $k'_X$ and $C'_Y$ corresponding to this dimensioning, obtained by numerical simulation, are given in Table 3.

TABLE 1

Tableau 1

| a | 1.7 |
|---|---|
| b | 100 |
| c | 10 |
| d | 3.6 |
| e | 3.6 |
| f | 10 |
| g | 120 |
| l | 100 |
| m | 2 |
| n | 2 |
| o | 5 |
| p | 1 |
| $t_{MEMS}$ | 20 |
| $t_{NEMS}$ | 0.25 |

TABLE 2

Tableau 2

| a | 4.15 |
|---|---|
| b | 30 |
| c | 12 |
| d | 13 |
| e | 5 |
| f | 15 |
| g | 120 |
| $t_{MEMS}$ | 20 |

TABLE 3

| Stiffnesses | Prior art (FIG. 3) | Example of implementation of the present technology (FIG. 8) | ratio |
|---|---|---|---|
| Stiffness in x, in N/m | $5 \times 10^3$ | $6.2 \times 10^5$ | 120 times greater |
| Stiffness in rotation (rotation about $\Delta_1$, parallel to Y), in N · m/rd | $1.4 \times 10^{-6}$ | $5.9 \times 10^{-8}$ | 24 times smaller |

As can be noticed from this example, the new link configuration set forth here makes it possible to increase stiffness in x, while substantially reducing stiffness in rotation about the axis of rotation of the mass considered (and at the same time facilitating the manufacture/reproducibility of the device).

The articles "a" and "an" may be employed in connection with various elements and components, processes or structures described herein. This is merely for convenience and to give a general sense of the processes or structures. Such a description includes "one or at least one" of the elements or components. Moreover, as used herein, the singular articles also include a description of a plurality of elements or components, unless it is apparent from a specific context that the plural is excluded.

It will be appreciated that the various embodiments and aspects of the inventions described previously are combinable according to any technically permissible combinations.

The invention claimed is:

1. A micro-electro-mechanical device comprising:
   a support,
   a movable frame, translationally guided with respect to the support along an axis of displacement parallel to a mean plane of the support,
   a proof mass, which extends from a first end to a second end of the proof mass,
      the first end being connected to the movable frame through a mechanical link allowing pivoting of the proof mass, relative to the movable frame, about an axis of rotation which is parallel to the mean plane of the support and perpendicular to the axis of displacement of the movable frame,
      the proof mass being connected, on the side of the second, movable end, to a member for detecting pivoting of the proof mass about its axis of rotation,
   wherein the mechanical link comprises:
      a thin wall which extends parallel to the mean plane of the support, from the movable frame to the first end of the proof mass, along a mean line which is parallel to the axis of displacement of the movable frame, and which, along an axis Z perpendicular to the mean plane of the support, has a thickness less than a thickness of the proof mass,
      a retaining element including a retaining wall
         which is perpendicular to the mean plane of the movable support,
         which, along a direction parallel to the axis of displacement of the movable frame, has an extension less than one quarter of the thickness of the retaining wall along the axis Z,
         and which is connected, on the one hand, to the movable frame and, on the other hand, to the first end of the proof mass.

2. The microelectromechanical device according to claim 1, wherein the thin wall has a thickness of less than one tenth of the thickness of the proof mass.

3. The device according to claim 1, wherein said extension of the retaining wall is less than one tenth of its thickness.

4. The device according to claim 1, wherein the retaining wall extends in a direction parallel to the axis of rotation of the proof mass, from a first end to a second end of the retaining wall, and wherein:
   a. the first end and the second end of the retaining wall are both connected to the movable frame, while the proof mass connects to the retaining wall in a median zone of said wall, between the first and second ends, or wherein
   b. the first end and the second end of the retaining wall are both connected to the proof mass, while the movable frame is connected to the retaining wall in a median zone of said retaining wall, between the first and second ends.

5. The device according to claim 1, wherein the retaining wall extends in a direction parallel to the axis of rotation of the proof mass, from a first end to a second end of the retaining wall, the first end of the retaining wall being connected to the movable frame while its second end is connected to the proof mass, or vice versa.

6. The device according to claim 5, comprising an additional retaining wall,
   a. which is perpendicular to the mean plane of the support,
   b. which, along a direction parallel to the axis of displacement of the frame, has an extension of less than one quarter of the thickness of the retaining wall along the axis Z,
   c. which extends, in a direction parallel to the axis of rotation of the proof mass, from a first end to a second end of the additional retaining wall, the first end of the additional retaining wall being connected to the movable frame while its second end is connected to the proof mass, or vice versa.

7. The device according to claim 1, wherein said retaining wall is formed by a portion of a thin silicon top layer of a silicon-on-insulator SOI substrate, and wherein the support of the device is formed by a thick support layer of said SOI substrate.

8. The device according to claim 1, of the gyrometer type, wherein the movable frame, the proof mass and the mechanical link form a first movable frame, a first proof mass and a first link respectively, the device further comprising:
   a. a second movable frame, translationally guided with respect to the support along said axis of displacement,
   b. a second proof mass, which extends from a first end to a second end of the second proof mass, the second end being located on the side of the first proof mass while the first end is located opposite thereto,
      i. the first end of the second mass being connected to the second frame through a second mechanical link identical to the first link,
      ii. the second proof mass being connected, on the side of its second movable end, to the same pivot detection member as the first proof mass,
   c. said detection member being a lever, rotatably movable about a detection axis of rotation which is parallel to the axis of rotation of the first proof mass, the lever being connected on one side to the first proof mass and on the other side to the second proof mass.

9. The device according to claim 8, further comprising an electromechanical actuation system configured to impose oscillation to each of the movable first and second frames along said axis of displacement, the displacement of the first movable frame relative to the support, and the displacement of the second movable frame relative to the support having a same amplitude and directions opposite to each other.

* * * * *